United States Patent [19]

Hildebrand et al.

[11] Patent Number: 4,505,324
[45] Date of Patent: Mar. 19, 1985

[54] SLIDER CONTROL

[75] Inventors: Reinhard Hildebrand; Bernd Waldmann, both of Redwitz, Fed. Rep. of Germany

[73] Assignee: Siemens Aktiengesellschaft, Munich, Fed. Rep. of Germany

[21] Appl. No.: 478,345

[22] Filed: Mar. 24, 1983

[30] Foreign Application Priority Data

Mar. 26, 1982 [DE] Fed. Rep. of Germany ....... 3211271

[51] Int. Cl.³ .................... H01H 9/04; G05G 1/02
[52] U.S. Cl. .......................... 165/42; 74/566; 116/28.1; 116/DIG. 20; 200/302.1; 200/304
[58] Field of Search .............. 277/12; 200/302, 304, 200/308, 310, 312, 317, 16 C, 16 D, 61.86; 180/90.6; 73/432 AD; 165/42, 43; 116/28 R, 28.1, 202, 322, 323, 324, DIG. 20; 74/566

[56] References Cited

U.S. PATENT DOCUMENTS 3,723,692 3/1973 Wilbrecht ..................... 200/168 H
3,737,594 6/1973 Rosmanith ....................... 200/16 R
4,027,361 6/1977 Yoneya ............................ 180/90.6
4,165,782 8/1979 Kumagai .............................. 165/11
4,389,757 6/1983 Luck et al. ...................... 180/90.6

FOREIGN PATENT DOCUMENTS 673394 6/1952 United Kingdom ............... 180/90.6

Primary Examiner—Charles Frankfort
Assistant Examiner—W. Morris Worth
Attorney, Agent, or Firm—Kenyon & Kenyon

[57] ABSTRACT

At a slot in a control panel of an automotive vehicle, the slot traversed by a slidable actuating lever for controlling the operating state of a heating and ventilating or air conditioning system of an automotive vehicle, an elongate web is disposed parallel and proximate to the slot for preventing the passage of light and dust. The web covers the slot, is attached at its ends to a control panel plate and traverses an opening in the lever.

1 Claim, 3 Drawing Figures

SLIDER CONTROL

BACKGROUND OF THE INVENTION

This invention relates to a slider control, i.e. a control having a sliding actuator, at the control panel of an automotive vehicle for varying or adjusting the operating state of the heating and ventilating system, and especially the air conditioning system, of the vehicle.

Heretofore, the leakage of stray light at such a slider control, i.e. the passage of light beams from a source behind the control panel through a slot therein traversed by the sliding actuator, has been inhibited by directly covering the radiant body or light source. This covering has been achieved, for example, by the deposition of vapor on the source or by the interposition of additional parts. The view from the passenger compartment into the space behind the control panel is left unobstructed. Frequently, such a design is troublesome.

An object of the present invention is to provide an improved slider control wherein the passage of stray light beams into the passenger compartment is prevented. Another object of this invention is to prevent the passage of dust through the slot and to thereby retard the accumulation of dust in the spaces behind the control panel.

SUMMARY OF THE INVENTION

In accordance with the present invention, a slider control is provided with a web disposed on a side of the slot opposite the passenger compartment, the web being at least coextensive with the slot to prevent the passage of light rays in one direction through the slot and the passage of dust in the opposite direction. The web is preferably anchored at its ends to the control panel and passes through an opening in the actuating lever on a side of the slot opposite the passenger compartment.

DETAILED DESCRIPTION

Figure 1:
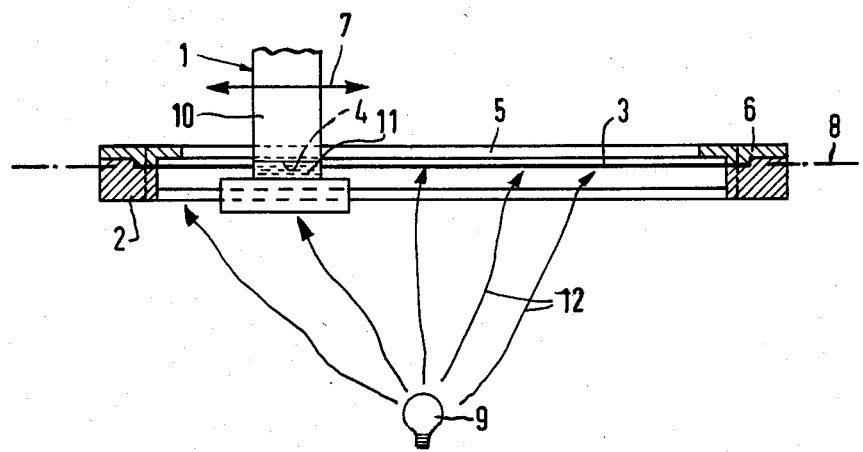
FIG. 1 is a longitudinal cross-sectional view of a slider control according to this invention.
Figures 2, 3:
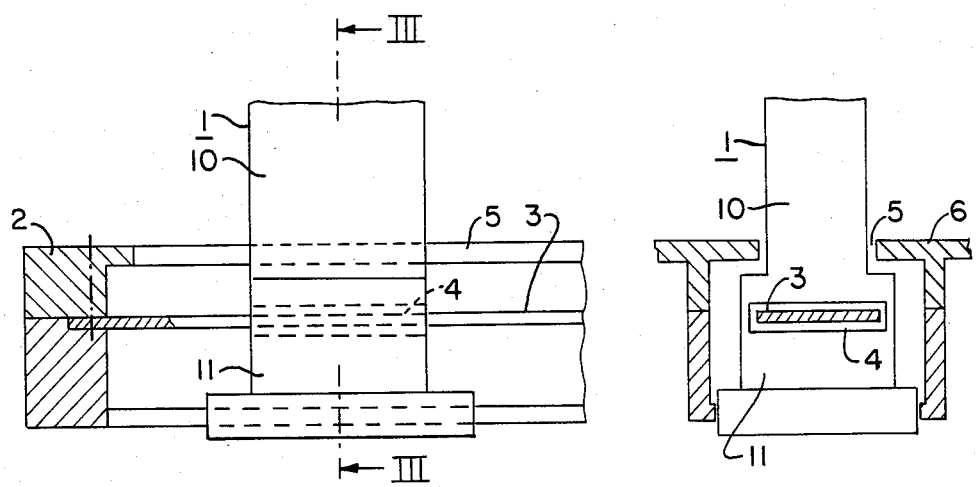
FIG. 2 is an enlarged longitudinal cross-sectional view of the slider control of FIG. 1.
FIG. 3 is a transverse cross-sectional view of the slider control taken along line III—III of FIG. 2.

As illustrated in the drawing FIGS. 1 and 2, an actuating or operating lever 1 of a slider control traverses an elongate slot 5 in a plate 6 forming a component of a control panel (not shown) facing a passenger compartment of an automotive vehicle. Lever 1 is slidable, as indicated by a double-headed arrow 7, along a linear path defined by slot 5.

In accordance with this invention, an elongate, substantially rectangular web or band 3 is disposed in a plane 8 parallel and proximate to slot 5. Web 3 is at least coextensive with slot 5 and covers the slot, thereby preventing light rays 12 from passing through slot 5 into the passenger compartment from a light source 9 located on a side of the control panel opposite the passenger compartment. Web 3 also functions to prevent the passage of dust from the passenger compartment into a space behind the control panel.

Web 3 is fastened or clamped at its ends (i.e. at its short edges as opposed to its long edges) to control panel plate 6 by means of a brace or backing element 2.

Actuating lever 1 has a thin upper portion 10 and a broad lower portion 11, upper portion 10 being narrower than slot 5 and lower portion 11 being broader than both slot 5 and web 3. Lower lever portion 11 is provided with an opening 4 of rectangular cross-section, which opening is traversed by web 3 as shown in FIG. 3.

What is claimed is:

1. In a slider control of a heating and ventilating system of an automotive vehicle having a passenger compartment and a control panel facing thereinto, said control panel being provided with a slot, said slider control comprising an actuating lever traversing said slot for enabling adjustment of the operating state of said heating and ventilating system, the improvement comprising:

a web disposed on a side of the slot opposite the passenger compartment and having a continuous portion at least coextensive with said slot and stationary with respect to the control panel; and an enlarged portion of the actuating lever disposed on a side of said slot opposite said passenger compartment and provided with an opening traversed by said web, said enlarged portion being broader than said web and said slot.

* * * * *